J. F. MacINDOE.
DEVICE FOR LUBRICATING ELEVATOR GUIDE RAILS.
APPLICATION FILED FEB. 4, 1909.
1,038,165.
Patented Sept. 10, 1912.
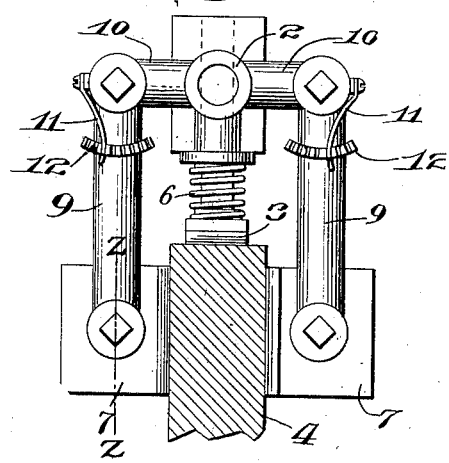
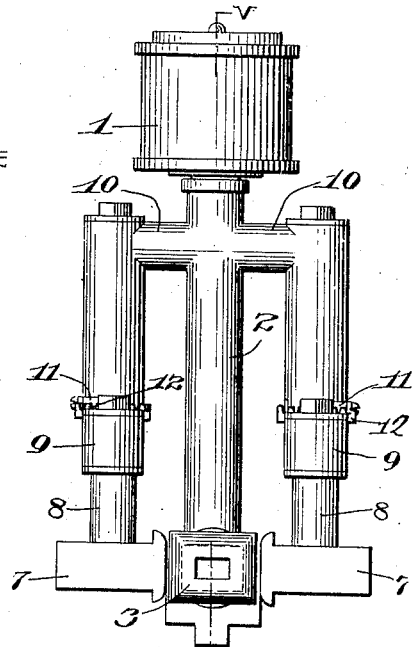
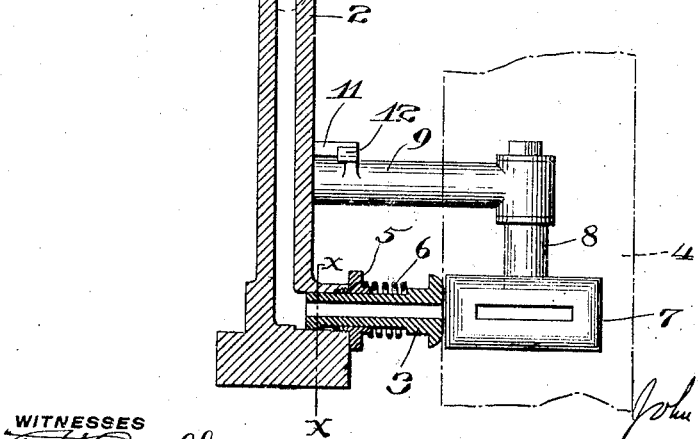
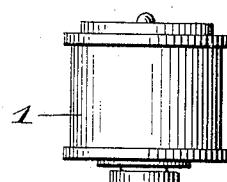
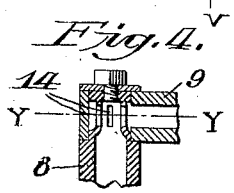
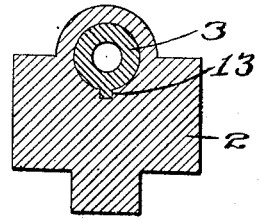
INVENTOR
John Franklin MacIndoe
WITNESSES
ATTORNEY

UNITED STATES PATENT OFFICE.

JOHN FRANKLIN MacINDOE, OF PHILADELPHIA, PENNSYLVANIA, ASSIGNOR TO AMERICAN ENGINEERING & MANUFACTURING COMPANY, A CORPORATION OF PENNSYLVANIA.

DEVICE FOR LUBRICATING ELEVATOR GUIDE-RAILS.

1,038,165.　　　　　Specification of Letters Patent.　　Patented Sept. 10, 1912.

Application filed February 4, 1909. Serial No. 475,973.

*To all whom it may concern:*

Be it known that I, JOHN FRANKLIN MAC-INDOE, a citizen of the United States, and a resident of the city and county of Philadelphia, State of Pennsylvania, have invented certain new and useful Improvements in Devices for Lubricating Elevator Guide-Rails, of which the following is a specification.

My invention relates to improvements in devices for lubricating the guide-rails of elevators, and the object of my invention is to furnish a device for automatically applying the lubricant to the rails as may be needed.

My lubricating device which is to be carried by the car, in any convenient and suitable manner, consists of a compression grease cup, or equivalent device, which is connected to a grease conduit which carries grease to one of the faces, preferably the front face, of the guide-rail. Connected to this conduit are conduits which carry the grease to the other faces of the guide-rail. The guide-rails of elevators are usually constructed with three guiding faces, a front face and two side faces, preferably my main conduit conducts the lubricant from the reservoir to the front face of the rail and from the main conduit lead other conduits which conduct the lubricant to the other faces of the rail. In order that the lubricant be properly distributed and that there shall not be a waste it is essential that the grease distributers make and maintain a perfect contact with the faces of the guide-rail. If the rails were always in line and if the guides of the car had no play on the rails perfectly rigid distributers might be used, but in practice, and particularly after the car has been in use for some time, the faces of the rail are more or less out of alinement and the guides of the car have more or less play, hence the lubricant distributers, which are carried by the car, have to be so arranged that they will automatically accommodate themselves to the irregularities and at all times make a perfect contact with the faces of the guide.

The object of my invention is to furnish a lubricator of the character described the conduits of which may be constructed of metallic tubes so articulated as to maintain the proper adjustment of the grease distributers, and my invention consists in the arrangement and construction of the parts as hereinafter described.

In the accompanying drawings forming part of this specification, and in which similar letters of reference indicate similar parts throughout the several views:—Figure 1, is a plan of my elevator guide lubricator, the grease cup being removed; Fig. 2, a front elevation of the complete lubricator; Fig. 3, a section of Fig. 2 on line V—V; Fig. 4, a section of Fig. 1 on line Z—Z; Fig. 5, a section of Fig. 4 on line Y—Y; Fig. 6, a section of Fig. 3 on line X—X.

1 is a compression grease cup of my approved construction. 2, a conduit connected to cup 1. At its lower end the conduit 2 is connected with the distributer 3 which lubricates the front face of the guide-rail 4. The distributer 3, in order that its face may at all times closely and flatly engage the front face of the guide-rail 4, is of a piston like construction, that is it is free to move in and out of its bearing in the conduit 2, a stuffing box 5 of usual construction being employed to prevent the leakage of lubricant between the distributer and the conduit. A spring 6 forces the distributer outward and holds its working face against the front face of the guide rail 4. A feather 13, Fig. 6, prevents the part 3 from turning on its longitudinal axis. This movable arrangement insures a constant contact between the working face of the distributer and the front face of the guide rail when the conduit and connected parts, which are carried by the car, are, during the movements of the car, moved to and from the rail.

The distributers 7 which lubricate the side faces of the guide rail 4 are furnished with a hollow stem 8 which is pivotally carried by the hollow arms 9 which are pivotally carried by the conduits 10 which are connected to the grease cup 1, preferably through the conduit 2, as shown. The arms 9 are forced inward toward the guide-rail 4 by suitable springs 11, Figs. 1, 2 and 3. In the drawings the spring 11 is shown as a flat spring one end of which is held by the conduit 10 and the other end of which engages a notched segment 12 carried by the arm 9. The tension of the spring 11 may be adjusted by moving it from notch to notch of the segment 12 as may be required. The inner ends of the arms 9 being pivotally carried by the conduits 12 the outer ends of these arms, which carry the grease distributers 7, may be moved in or out as may be necessary to compensate for irregularities in alinement of the guide-rails or for play of the car upon the rails. In connection with this arrangement the pivotal attachment of the grease distributers 7 to the arms 9 will insure the working faces of these distributers always flatly engaging the side faces of the guide-rail a condition essential not only for the perfect lubrication of the rail but also to prevent waste of grease. The grease being under pressure it will be seen that unless the contact between the distributers and the faces of the guide-rail are maintained an unnecessary amount of grease will be used.

Fig. 4 shows a section through the pivotal connection of the arm 9 to stem 8, the construction of the joint between the arm 9 and the conduit 10 being substantially the same. The stem is furnished with perforations 14 for the passage of the lubricant from one conduit to the other, the construction being substantially that of a plug cock.

Having thus described my invention I claim as new and desire to secure by Letters Patent:

In a device of the character described, in combination, a grease cup, a conduit connected to said cup, an arm pivotally connected to said conduit, a notched segment carried by said arm, a spring carried by said conduit adapted to engage said segment to throw said arm inward, and a grease distributer pivotally carried by said arm, said arm and distributer forming a continuation of said conduit.

JOHN FRANKLIN MacINDOE.

Witnesses:
FERD. E. V. SAPPINGTON,
CHARLES A. RUTTER.